(12) United States Patent
Tanaka et al.

(10) Patent No.: US 7,730,983 B2
(45) Date of Patent: Jun. 8, 2010

(54) POWER CONTROL FOR HYBRID MOTORCYCLE

(75) Inventors: Hiroshi Tanaka, Shizuoka-ken (JP); Hideki Shirazawa, Shizuoka-ken (JP); Hideaki Suzuki, Shizuoka-ken (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 387 days.

(21) Appl. No.: 11/782,432

(22) Filed: Jul. 24, 2007

(65) Prior Publication Data
US 2008/0023239 A1    Jan. 31, 2008

(30) Foreign Application Priority Data
Jul. 25, 2006   (JP)  ............... 2006-201857

(51) Int. Cl.
*B60W 10/08* (2006.01)
*B60W 10/00* (2006.01)

(52) U.S. Cl. ............... 180/65.285; 180/65.21; 180/65.265; 180/65.275

(58) Field of Classification Search ............... 180/65.21, 180/65.245, 65.26, 65.265, 65.275, 65.285, 180/65.31, 65.6, 65.7; 903/930
See application file for complete search history.

(56) References Cited

U.S. PATENT DOCUMENTS

| 5,939,848 | A | * | 8/1999 | Yano et al. ............... 318/139 |
| 6,018,198 | A | * | 1/2000 | Tsuzuki et al. ............ 290/17 |
| 6,124,690 | A | * | 9/2000 | Yano et al. ............... 318/376 |
| 6,476,573 | B2 | * | 11/2002 | Omata et al. ............. 318/445 |
| 6,907,948 | B2 | * | 6/2005 | Wakashiro et al. ........ 180/65.25 |
| 2001/0020789 | A1 | * | 9/2001 | Nakashima ............ 290/40 C |
| 2006/0180363 | A1 | * | 8/2006 | Uchisasai et al. ........ 180/65.2 |

FOREIGN PATENT DOCUMENTS

| EP | 1 342 610 A2 | 9/2003 |
| EP | 1 529 672 A2 | 5/2005 |
| JP | 2000-287306 A | 10/2000 |

OTHER PUBLICATIONS

European Search Report dated Feb. 4, 2008.

* cited by examiner

*Primary Examiner*—Glenn Dayoan
*Assistant Examiner*—Bryan A Evans
(74) *Attorney, Agent, or Firm*—Keating & Bennett, LLP

(57) ABSTRACT

An automatic centrifugal clutch is interposed in a power transmission system between an engine and a driving wheel. A motor, which is capable of generating electricity, is supplied with electricity from a battery to generate auxiliary power. The motor is connected to a crankshaft of the engine. An acceleration data acquisition component acquires the accelerator operation amount and the accelerator operation speed. A delay time setting component sets a delay time according to the acceleration data. A motor controller supplies the motor 13 with a magnitude of electricity in accordance with the acceleration operation amount after the delay time has elapsed from the moment when an accelerator grip was moved from an idle position.

22 Claims, 11 Drawing Sheets

POWER CONTROL FOR HYBRID MOTORCYCLE

CROSS-REFERENCE TO RELATED APPLICATIONS

This application claims foreign priority benefits under 35 USC §119(a)-(d) from Japanese Patent Application No. 2006-201857, filed on Jul. 25, 2006, which is hereby incorporated by reference in its entirety.

BACKGROUND OF THE INVENTION

1. Field of the Invention

The present invention generally relates to hybrid motorcycles featuring an engine and a motor. More particularly, the present invention relates to such motorcycles in which the supply of auxiliary power from the motor is controlled to reduce the likelihood of automatic clutch slippage.

2. Description of the Related Art

A conventional hybrid vehicle run by power from an engine and auxiliary power from a motor is disclosed in, for example, JP-A-2000-287306. The motor of the vehicle disclosed in JP-A-2000-287306 is connected to a crankshaft of the engine and operation of the motor is controlled by a control device. Auxiliary power from the motor and power from the engine are combined at the crankshaft and the combination is transmitted to a driving wheel as a resultant force. A power transmission system between the engine and the driving wheel includes a manually operable clutch.

The vehicle disclosed in JP-A-2000-287306 is run primarily by power from the engine, to which the power from the motor is added when the vehicle begins moving in order to increase the driving force. The control device turns the motor to generate a predetermined torque when predetermined starting conditions are satisfied. One of the starting conditions for this vehicle is that the manually operable clutch is engaged.

A clutch switch can be used to detect whether or not the clutch is engaged. In general, in vehicles such as automobiles, a clutch is disengaged when the operator presses a clutch pedal, and the clutch switch detects displacement of the clutch pedal or displacement of a detection element integrated with the clutch pedal.

SUMMARY OF THE INVENTION

The present inventors considered providing a scooter-type hybrid motorcycle utilizing the conventional technique for hybrid vehicles described above. The scooter-type motorcycle, however, is provided with an automatic centrifugal clutch, rather than a manually operable clutch. The automatic centrifugal clutch is positioned in the power transmission system between the engine and the rear wheel. For at least this reason, as explained in more detail below, it has not been easy to realize a scooter-type hybrid motorcycle.

Different from the engine, the motor generates large torque at relatively low speed. Thus, if the clutch is not completely engaged when applying auxiliary power from the motor when the motorcycle starts running, transmission of this large torque causes friction members in the clutch to slip, which makes it difficult, if not impossible, for the motorcycle to start moving. That is, if it is not possible to accurately detect when the automatic centrifugal clutch is completely engaged, that would be a problem in realizing a scooter-type hybrid motorcycle.

The clutch switch used in JP-A-2000-287306 merely detects displacement of a manually operable member, and thus cannot detect when the automatic centrifugal clutch is completely engaged. Even if the clutch switch could detect the time when engagement is complete, providing such a clutch switch would increase the cost, and if the clutch switch failed, auxiliary power could not even be applied in the desired manner.

Therefore, one object of an embodiment of the present invention is to provide a hybrid motorcycle with excellent start and acceleration performance in spite of including an automatic centrifugal clutch.

BRIEF DESCRIPTION OF THE DRAWINGS

These and other features, aspects and advantages of embodiments of the present invention will be described below with reference to the attached drawings. The drawings comprise the following figures.

FIGS. 5(A)-5(C) are graphs that explain how to set a delay time in one configuration in which

DETAILED DESCRIPTION OF THE PREFERRED EMBODIMENT

Figure 1:
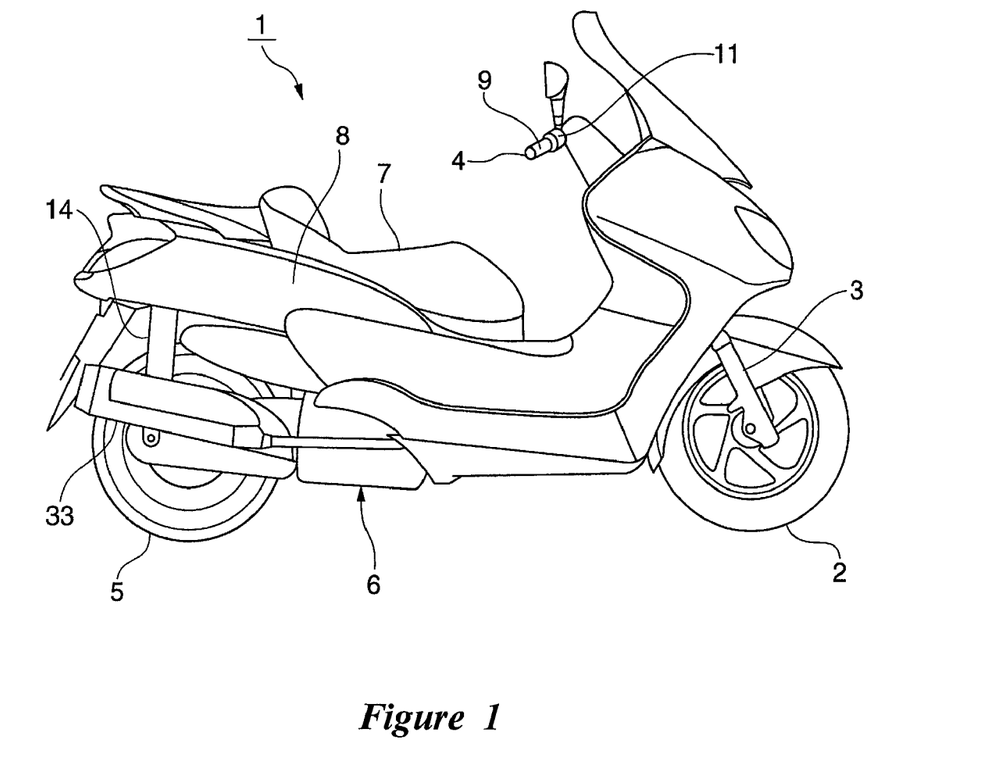
FIG. 1 is a side view of a hybrid motorcycle that is arranged and configured in accordance with certain features, aspects and advantages of the present invention.

With reference initially to FIG. 1, a hybrid motorcycle 1 comprises a front wheel 2 that is supported by a front fork 3.

The front fork 3 is connected to steering handlebars 4. The hybrid motorcycle 1 also comprises a rear wheel 5, which also may be referred to as the driving wheel in the illustrated embodiment. A power unit 6 is supported by the hybrid motorcycle 1 and is connected by a driveline to the rear wheel 5 in the illustrated configuration. The hybrid motorcycle 1 also comprises a seat 7 and a body cover 8.

The front wheel 2 can be steered to the left and right by rotating the steering handlebars 4. An accelerator grip 9, which can be used to increase and decrease the operator demand for driving force from the power unit 6, and a front wheel brake lever (not shown) are provided at a right end of the steering handlebars 4. The accelerator grip 9 can comprise an accelerator operating element in some configurations of the present invention. Other accelerator operating elements also can be used, including but not limited to, thumb paddles and the like.

The accelerator grip 9 can be supported for generally free rotational movement on the steering handlebars 4, although not shown. The accelerator grip 9 can be provided with an accelerator operation amount detector 11 (hereinafter simply referred to as "APS" or accelerator position sensor). The APS 11 detects the operation amount (e.g., the rotational angle relative to a predetermined orientation relative to the handlebars) of the accelerator grip 9.

The rear wheel 5 is supported generally rearward of the power unit 6 and the rear wheel 5 is mechanically connected to the power unit 6 such that the rear wheel 5 can be driven by power from an engine 12 and by auxiliary power from a motor 13, both which are provided in the illustrated power unit 6.

In the illustrated configuration, the power unit 6 is a unit swing type and can be supported for generally free vertical pivoting movement on a body frame by a link mechanism (not shown), which can be coupled to the front end. As shown in FIG. 1, a cushion unit 14 can be interposed between the rear end of the power unit 6 and the body frame (not shown).

Figure 2:
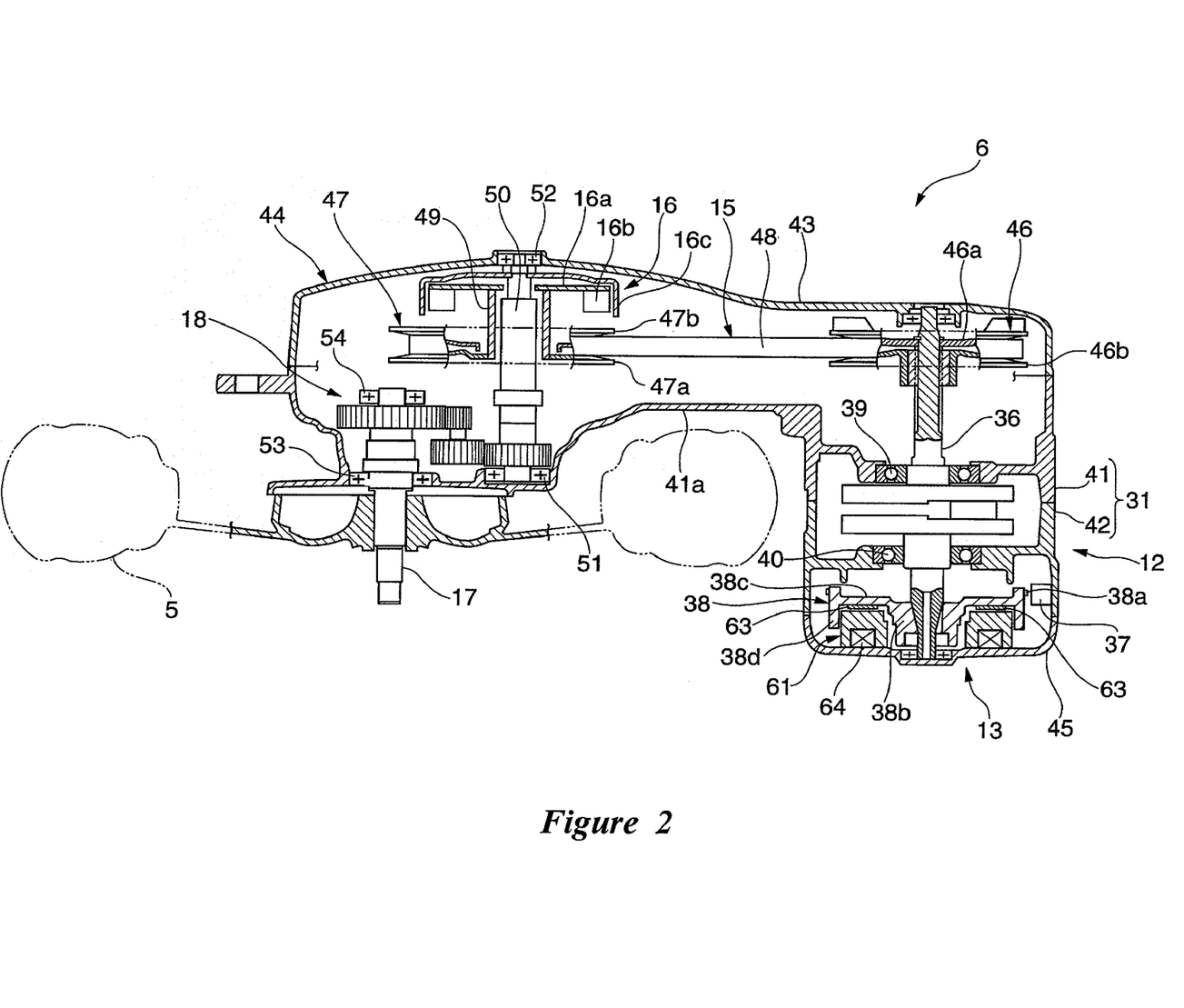
FIG. 2 is a horizontal cross sectional view of a power unit used in the hybrid motorcycle of FIG. 1.

As shown in FIG. 2, one configuration of the power unit 6 comprises an engine 12 and a motor 13 provided at its forward end (i.e., on the right side in FIG. 2), a belt-type continuously variable transmission 15 (hereinafter simply referred to as "CVT") extending longitudinally on the left side of the vehicle body, an automatic centrifugal clutch 16 provided at the rear end of the CVT 15, a gear-type speed reducer 18 provided between the automatic centrifugal clutch 16 and an axle 17 of the rear wheel 5, and a control device 19 (see FIG. 3) that is used to control the operation of the engine 12 and the motor 13.

Figure 3:
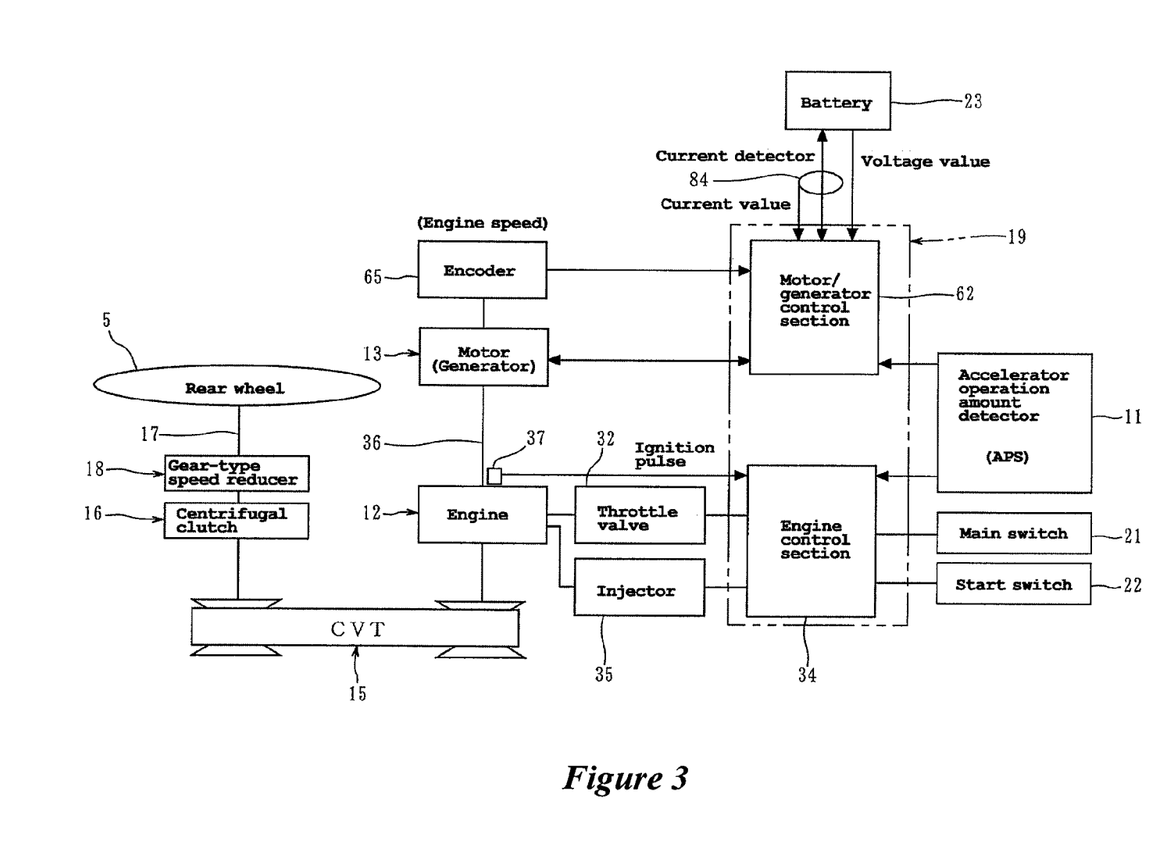
FIG. 3 is a block diagram showing a possible configuration of a control system of the hybrid motorcycle of FIG. 1.

A main switch 21, a start switch 22, a battery 23 and the like can be connected to the control device 19. The start switch 22 is used to start the engine 12. In the illustrated configuration, the start switch 22 causes the motor 13 to turn such that the motor 13 can be used to start the engine 12. Thus, when starting, the motor 13 substantially functions as a starter motor. In other configurations, a dedicated starter motor may be used to start the engine 12.

The engine 12 preferably is a 4-cycle engine, which includes a crankcase 31 shown in FIG. 2 and a cylinder (not shown) provided in front of the crankcase 31 and extending upward. An intake system comprising a throttle valve 32 (see FIG. 3) and an exhaust system comprising a muffler 33 (see FIG. 1) can be connected to the cylinder.

The throttle valve 32 is connected to the accelerator grip 9 via a wire (not shown), and opens and closes through operation of the accelerator grip 9. In some configurations, a wireless system, or any other suitable configuration, can be used. The throttle valve 32 is provided with a throttle valve opening sensor (not shown) that is used to detect the opening or position of the throttle valve 32. The throttle valve opening sensor can be connected to an engine control section 34 of the control device 19 shown in FIG. 3 and transmits to the engine control section 34 the opening or position of the throttle valve 32 as detected data.

The engine 12 is arranged in such that the fuel injector 35 (see FIG. 3) injects fuel into an intake passage. The fuel injection amount from the fuel injector 35 preferably is set by the engine control section 34 according to the position of the throttle valve 32 and the speed of the engine 12. The speed of the engine 12 can be calculated using the number of ignition pulses generated by an ignition system having an ignition plug (not shown). Other configurations also can be used. The ignition timing of the engine 12 can be set by the engine control section 34 based on the rotational angle of the crankshaft 36.

The rotational angle of the crankshaft 36 can be detected by an electromagnetic pickup 37 (see FIG. 2), which can be attached to the crankcase 31. The electromagnetic pickup 37 is positioned to face a tooth 38a of a rotor 38 (see FIG. 2) of the motor 13 and the electromagnetic pickup 37 sends a signal (e.g., a detection signal) to the engine control section 34 when the tooth 38a is magnetically detected.

As shown in FIG. 2, the crankshaft 36 of the engine 12 is supported on the crankcase 31 by bearings 39, 40 for free rotation. The crankcase 31 comprises a left half 41 and a right half 42. The left half 41 is formed integrally with a longitudinally extending portion 41a that extends along a left side of the rear wheel 5, to which a transmission case cover 43 can be attached.

The left half 41 of the crankcase 31 and the transmission case cover 43 form, at least in part, a transmission case 44 that supports the CVT 15, the automatic centrifugal clutch 16, the gear-type speed reducer 18 and the like. A motor housing 45 for the motor 13 also can be attached to the right half 42 of the illustrated crankcase 31.

As shown in FIG. 2, a driving pulley 46 of the CVT 15 is mounted to an end of the crankshaft 36 on the left side of the vehicle body. The driving pulley 46 comprises a fixed sheave half 46a, which is secured to the crankshaft 36, a movable sheave half 46b, which is axially moveable relative to the crankshaft 36 but not capable of substantial rotation relative thereto, and a drive mechanism (not shown) that moves the movable sheave half 46b axially on the crankshaft 36.

The CVT 15 comprises the driving pulley 46, a driven pulley 47, which is positioned rearwardly of the driving pulley 46, and a V-belt 48 wrapped around both pulleys 46, 47. As is well known, the CVT 15 supplies the rotation of the crankshaft 36 to the rotary shaft 49 at varying ratios. The driven pulley 47 comprises a fixed sheave half 47a, which is fixed to the rotary shaft 49, and a movable sheave half 47b, which is axially moveable, but not substantially rotationally moveable, relative to the rotary shaft 49. The moveable sheave half 47b also preferably is urged toward the fixed sheave half 47a by a compression coil spring (not shown) or the like.

The rotary shaft 49 preferably is formed in the shape of a cylinder. The rotary shaft 49 preferably is supported for rotation by a bearing (not shown) on an intermediate shaft 50 that extends into a hollow portion of the rotary shaft 49. The intermediate shaft 50 is supported on the transmission case 44 for rotation by bearings 51, 52. An input part 16a of the automatic centrifugal clutch 16 preferably is connected to an end of the rotary shaft 49 on the left side of the vehicle body.

The automatic centrifugal clutch 16 comprises the input part 16a, which has a clutch shoe 16b. The automatic centrifugal clutch also comprises a clutch outer 16c that houses the input part 16a. The clutch outer 16c can be secured to an end of the intermediate shaft 50 on the left side of the vehicle body.

An end of the intermediate shaft 50 on the right side of the vehicle body is connected to the axle 17 of the rear wheel 5 via the gear-type speed reducer 18, which is a two-staged type. The axle 17 of the rear wheel 5 is supported for free rotation on the transmission case 44 through bearings 53, 54.

With the thus constructed power unit 6, rotation of the crankshaft 36 is transmitted from the driving pulley 46 via the V-belt 48 to the driven pulley 47 of the CVT 15, and then from the rotary shaft 49 to the input part 16a of the automatic centrifugal clutch 16. As the rotation of the crankshaft 36 increases, the rotation of the input part 16a increases. Then, a centrifugal force increases the diameter of the clutch shoe 16b, which causes the clutch shoe 16b to engage with the clutch outer 16c. This in turn causes the clutch outer 16c to rotate. This rotation is transmitted from the intermediate shaft 50 via the gear-type speed reducer 18 to the axle 17 (rear wheel 5).

As shown in FIG. 2, a rotor 38 of the motor 13 to be discussed later is mounted to an end of the crankshaft 36 on the right side of the vehicle body.

The motor 13 is intended to apply auxiliary power to the crankshaft 36, and has a function to generate electricity by being driven by the engine 12. The motor 13 includes the above rotor 38 and a stator 61 fixed to the motor housing 45, and as shown in FIG. 3, is connected to a motor/generator control section 62 of the control device 19.

The rotor 38 is made up of a boss 38b fixed to the crankshaft 36, a disk 38c extending radially from an end of the boss 38b on the left side of the vehicle body, a cylinder 38d housing the disk 38c, and a permanent magnet 63 secured to an end surface of the disk 38c on the right side of the vehicle body. The tooth 38a to be detected by the electromagnetic pickup 37 is formed on the outer periphery of the cylinder 38d. The motor 13 directly drives the crankshaft 36.

The stator 61 incorporates a coil 64, and is fixed to the motor housing 45 in such a manner as to be partially inserted into the cylinder 38d and face the permanent magnet 63. The stator 61 is provided on a circumference centered on the axis of the crankshaft 36.

The stator 61 of the motor 13 also incorporates an encoder 65 (see FIG. 3) for detecting the speed of the rotor 38 (speed of the crankshaft 36).

Figure 4:
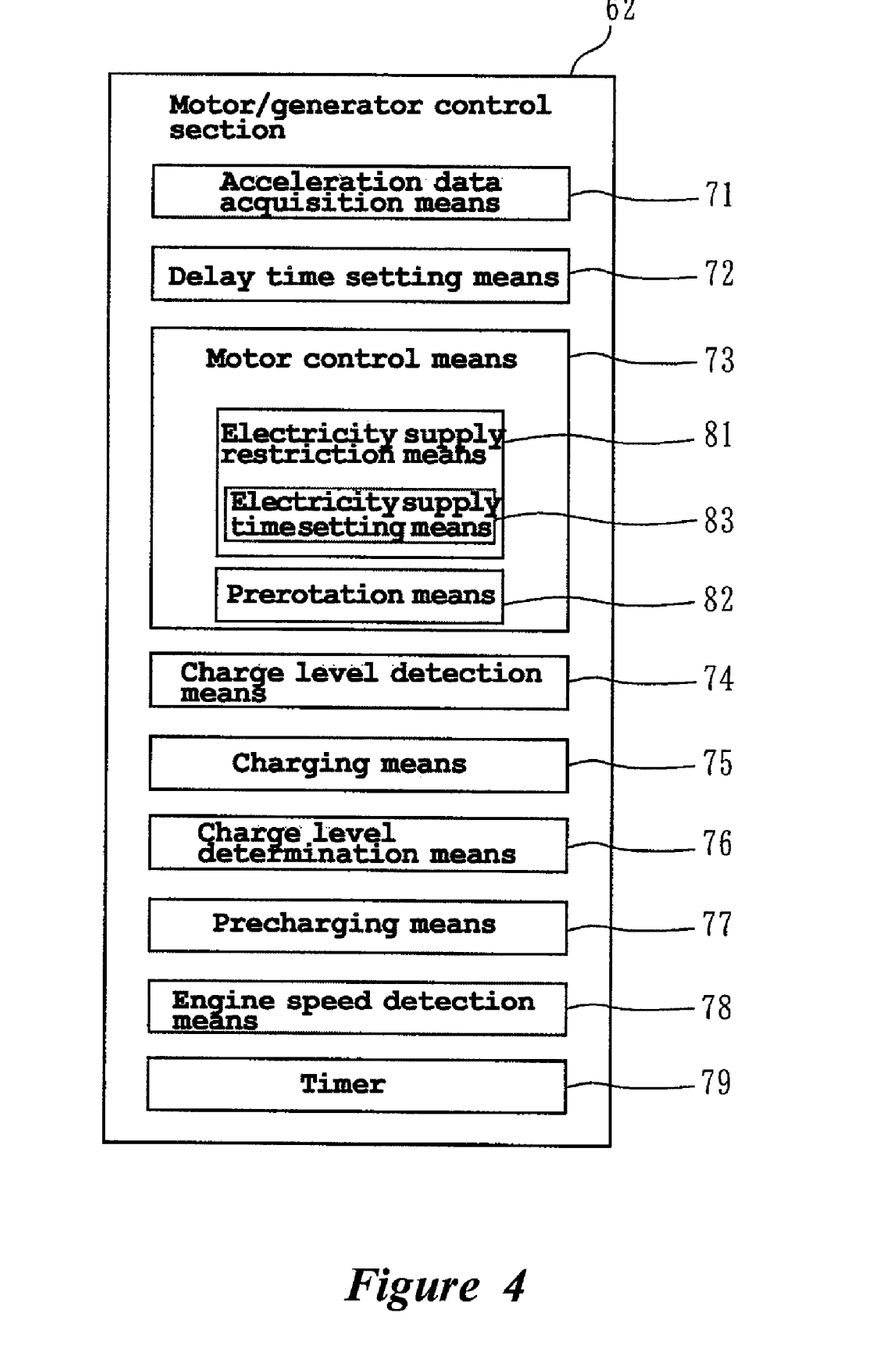
FIG. 4 is a block diagram showing a possible configuration of a motor/generator control section of the control system of FIG. 3.

The motor/generator control section 62 is intended to control when the motor 13 is supplied with electricity and the magnitude of the electricity that is supplied. The motor/generator control section 62 also switches the motor 13 being motor and generator modes of operation. As shown in FIG. 4, the motor/generator control section 62 comprises an acceleration data acquisition component 71, a delay time setting component 72, a motor control component 73, a charge level detection component 74, a charging component 75, a charge level determination component 76, a precharging component 77, an engine speed detection component 78 and a timer 79.

The acceleration data acquisition component 71 preferably acquires the accelerator operation amount (i.e., the operation angle of the accelerator grip 9) detected by the APS 11 and the accelerator operation speed (i.e., the speed at which the accelerator grip 9 is operated) as acceleration data.

The delay time setting component 72 sets the delay time, which is a period from the moment when the accelerator operation is started (i.e., when the accelerator grip 9 is twisted) to the moment when the motor 13 is started, as will be discussed later. Preferably, the delay time is set to a length long enough for the automatic centrifugal clutch 16 to be completely engaged.

For example, if the accelerator grip 9 is turned a large angle at a very rapid rate, the power from the engine 12 that is applied to the automatic centrifugal clutch 16 increases, which requires a relatively long time for the automatic centrifugal clutch 16 to be completely engaged. Thus, the delay time is set to be relatively long. If the delay time is not set, auxiliary power is generated by the driving of the motor 13 right at the start of the accelerator operation and too large a torque is applied before the automatic centrifugal clutch 16 has been completely engaged. Thus, the clutch shoe 16b may slip, which may prevent the vehicle from moving because the clutch is not engaged.

The delay time setting component 72 selects a longer one of a provisional delay time that can be based on the accelerator operation amount (hereinafter referred to as "first delay time") and a provisional delay time that can be based on the accelerator operation speed (hereinafter referred to as "second delay time"). The selected provisional delay time is set as the final delay time.

Figure 5:
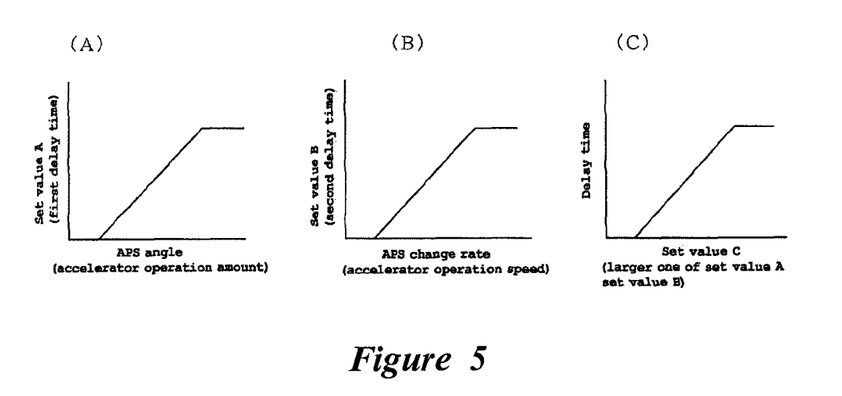
FIG. 5(A) is a map used to obtain a first delay time based on the APS angle.
FIG. 5(B) is a map used to obtain a second delay time based on the APS change rate.
FIG. 5(C) is a graph showing changes in actual delay time based on the first delay time and the second delay time.

One configuration of the delay time setting component 72 sets the final delay time using maps such as those shown in FIGS. 5(A) to 5(C). FIG. 5(A) is a map from which a set value A can be obtained. The set value A can be equivalent to the first delay time, which is based upon the accelerator operation amount. FIG. 5(B) is a map from which the set value B can be obtained. The set value B can be equivalent to the second delay time, which is based upon the accelerator operation speed. FIG. 5(C) is a map from which the final delay time can be obtained based on the set value A and the set value B.

As shown in FIG. 5(A), the set value A is set such that the delay time becomes longer as the accelerator operation amount becomes larger until the accelerator operation amount reaches a predetermined upper limit, and such that the delay time maintains a constant maximum time, even if the accelerator operation amount increases, after the accelerator operation amount has reached the upper limit.

As shown in FIG. 5(B), the set value B is set such that the delay time becomes longer as the accelerator operation speed becomes higher until the accelerator operation speed reaches a predetermined upper limit, and such that the delay time maintains a constant maximum time, even if the accelerator operation speed increases, after the accelerator operation speed has reached the upper limit.

The delay time setting component 72 reads a set value A in accordance with the accelerator operation amount acquired by the acceleration data acquisition component 71 from the map shown in FIG. 5(A). The delay time setting component 72 also reads a set value B in accordance with the accelerator operation speed acquired by the acceleration data acquisition component 71 from the map shown in FIG. 5(B). The delay time setting component 72 then compares the set value A and the set value B, applies the larger one of the set values A, B to the map shown in FIG. 5(C) as a set value C, and reads the final delay time in accordance with the set value C.

The motor control component 73 comprises an electricity supply restriction component 81 and a prerotation component 82. The motor control component 73 supplies the motor 13 with a magnitude of electricity in accordance with the accelerator operation amount after the delay time has elapsed from the moment when the accelerator grip 9 in an idling state was operated.

Whether or not the accelerator grip 9 is in an idling state is detected using the accelerator operation amount acquired by the acceleration data acquisition component 71. That is, the accelerator grip 9 is determined to be in an idling state if the accelerator operation amount is 0.

Whether or not the accelerator grip 9 has been operated is detected by determining whether or not the accelerator operation amount has changed from 0. The timer 79 measures the time from the start of an accelerator operation until the delay time elapses.

Figure 6:
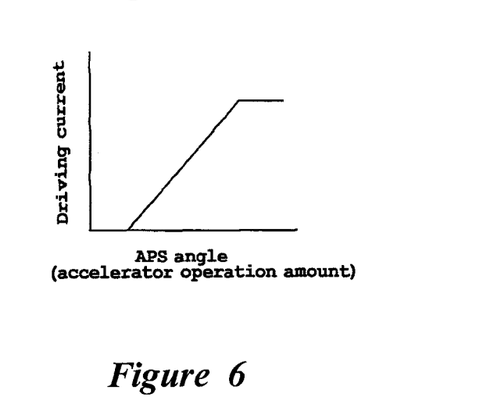
FIG. 6 is a graph showing a relationship between APS angle and driving current for a motor.

In supplying the motor 13 with a magnitude of electricity in accordance with the accelerator operation amount, the motor control component 73 reads a magnitude of driving current in accordance with the accelerator operation amount from the map such as that shown in FIG. 6 and controls the voltage such that the desired magnitude of driving current flows through the motor 13. The motor control component 73 supplies the motor 13 with electricity only when the charge level of the battery 23 is above a minimum charge level.

The electricity supply restriction component 81 restricts the length of time during which the motor control component 73 can supply the motor 13 with electricity to a predetermined electricity supply time. The electricity supply time is set by an electricity supply time setting component 83. That is, the electricity supply restriction component 81 continues the supply of electricity to the motor 13 for the electricity supply time and discontinues the supply of electricity to the motor 13 after the electricity supply time has elapsed.

Figure 7:
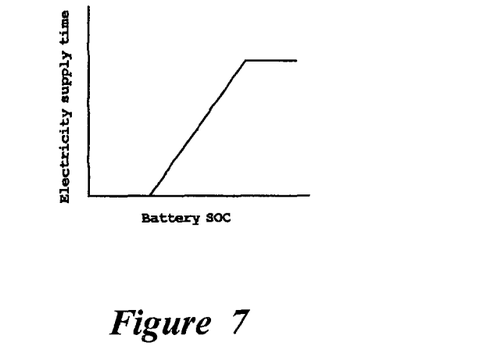
FIG. 7 is a graph showing a relationship between a charge level of a battery and an electricity supply time to the motor.

The electricity supply time setting component 83 changes the electricity supply time according to the charge level of the battery 23 detected by the charge level detection component 74. In changing the electricity supply time, the electricity supply time setting component 83 can use a map such as that shown in FIG. 7. FIG. 7 is a graph showing the driving time for a charge level of the battery 23 (battery SOC). As shown in the graph, the electricity supply time is set to be shorter as the charge level of the battery 23 becomes lower. The electricity supply time setting component 83 reads an electricity supply time in accordance with the present charge level of the battery 23 from a map such as that shown in FIG. 7 and sends the electricity supply time to the electricity supply restriction component 81. That is, the electricity supply restriction component 81 shortens the electricity supply time as the charge level detected by the electricity supply time setting component 83 becomes lower.

The prerotation component 82 is intended to reduce the likelihood of the motor 13, when not generating auxiliary power, from serving as a load on the engine 12. The prerotation component 82 also is arranged to start energization in order to rotate the motor 13 when the speed of the engine 12 has reached a predetermined prerotation speed. In this embodiment, the prerotation speed is set to be lower than the speed of the engine 12 in an idling state (idling speed).

That is, in the hybrid motorcycle 1 according to this embodiment, the prerotation component 82 rotates the motor 13 in conjunction with the rotation of the engine 12 after an engine start and when the engine speed has reached the prerotation speed, which is lower than the idling speed. The speed of the engine 12 is detected by the engine speed detection component 78. The engine speed detection component 78 is arranged to obtain the speed of the crankshaft 36 using the encoder 65.

Figure 8:
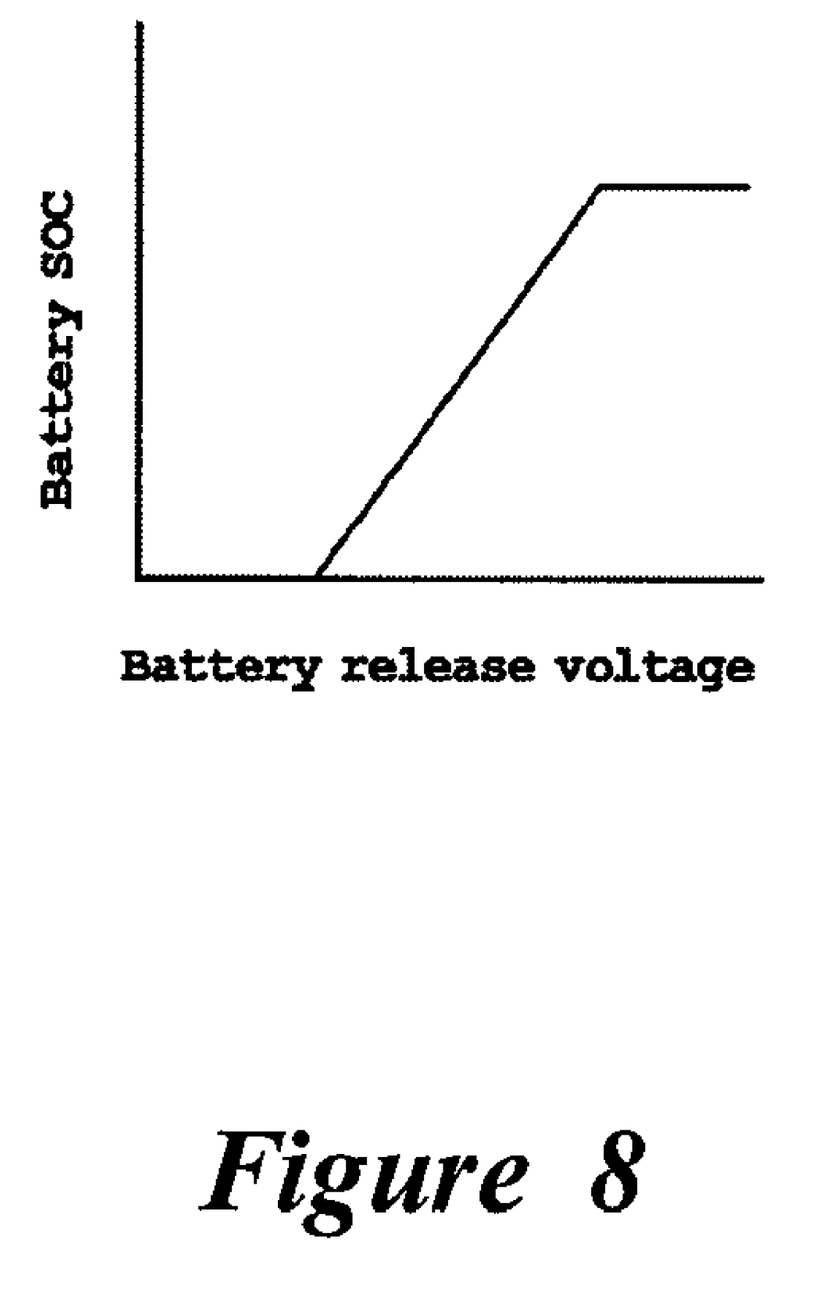
FIG. 8 is a graph showing a map for obtaining the charge level of the battery based on an open circuit voltage of the battery.

The charge level detection component 74 obtains a charge level (SOC) of the battery 23 in accordance with the release voltage of the battery 23 using a map such as the graph shown in FIG. 8, and then adds to this charge level the current amount while the battery 23 is charging and subtracts the current amount while the battery 23 is discharging to obtain the present charge level. The battery release voltage is detected by the charge level detection component 74 while electricity in the battery 23 is not consumed or while the battery 23 is not charged, for example when the engine is stopped. The battery 23 is charged by the charging component 75. In one configuration, the current while charging and the current while the battery 23 is discharging are measured by a current detector 84 (see FIG. 3) provided in the circuit connecting the battery 23 and the motor/generator control section 62.

Figure 9:
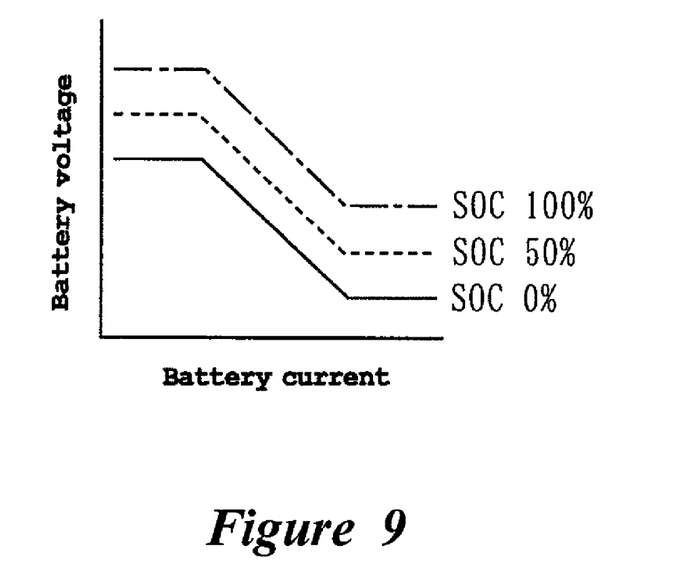
FIG. 9 is a graph showing a map for obtaining the charge level of the battery based on a battery current and a battery voltage.

Instead of measuring and adding the charge current and the discharge current each time as discussed above, a map such as that shown in FIG. 9 may be used to detect the charge level of the battery 23 during engine operation. In the map shown in FIG. 9, the charge level (SOC) of the battery 23 is defined by the battery current and the battery voltage. The map shows the relation between the voltage between the terminals of the battery 23 and the current flowing through the battery 23 at each charge level from 0% to 100%. In the case of using this map to obtain the charge level of the battery 23, the charge level detection component 74 detects the present values of the current flowing through the battery 23 and the voltage between the terminals of the battery 23, and reads a charge level (SOC) in accordance with these current and voltage values from the map.

The charging component 75 causes the motor 13 to function as a generator such that it generates electricity after the electricity supply time has elapsed and charges the battery 23 with the generated electricity. The charging component 75 also changes the amount of electricity to be generated according to the charge level detected by the charge level detection component 74. That is, the charging component 75 reduces the charge current when the charge level of the battery 23 is relatively high and increases the charge current when the charge level of the battery 23 is relatively low.

In one configuration, the charge level determination component 76 compares the charge level of the battery 23 detected by the charge level detection component 74 and the predetermined minimum charge level if auxiliary power is not generated by the driving of the motor 13. The charge level determination component 76 also can send a control signal to the prerotation component 82 to discontinue the supply of electricity to the motor 13 and sends a control signal to the precharging component 77 to start charging when the charge level of the battery 23 is lower than the minimum charge level. On receiving the control signal, the prerotation component 82 stops the supply of electricity to the motor 13.

When the control signal is sent from the charge level determination component 76, the precharging component 77 causes the motor 13 to function as a generator and to generate electricity if auxiliary power is not generated by driving of the motor 13. The charge current while generating electricity is read from the map such as that shown in FIG. 10 and set. The map preferably shows the charge current and the discharge current of the battery 23 for a charge level (SOC) of the battery 23.

Figure 10:
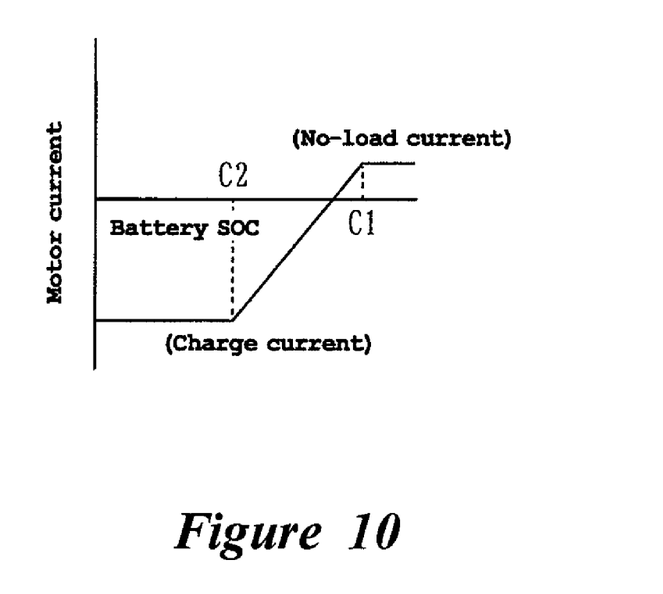
FIG. 10 is a graph showing a map for setting a charge current and a discharge current for a charge level of the battery.

As can be understood from this map, the precharging component 77 according to this embodiment increases the charge current as the charge level of the battery 23 becomes lower when the charge level is between the minimum charge level C1 and a limit value C2 lower than that. Also, the precharging component 77 performs charging at a constant maximum charge current when the charge level is lower than the limit value C2. When the motor 13 operates as a generator while the engine 12 is in low-speed operation, the engine control section 34 of the hybrid motorcycle 1 increases the fuel injection amount from the injector 35 to stabilize the rotation of the engine 12.

When the accelerator grip 9 is in an idling position, for example, the fuel injection amount is controlled such that the engine speed reaches the idling speed during normal operation. When the accelerator operation amount is increased from the idling position, the engine control section 34 increases the fuel injection amount according to the increase in accelerator operation amount. Thus, since the fuel injection amount is increased according to an increase in load due to electricity generation by the motor 13, the engine 12 is less likely to stall because of such an increase in load due to electricity generation.

Figure 11:
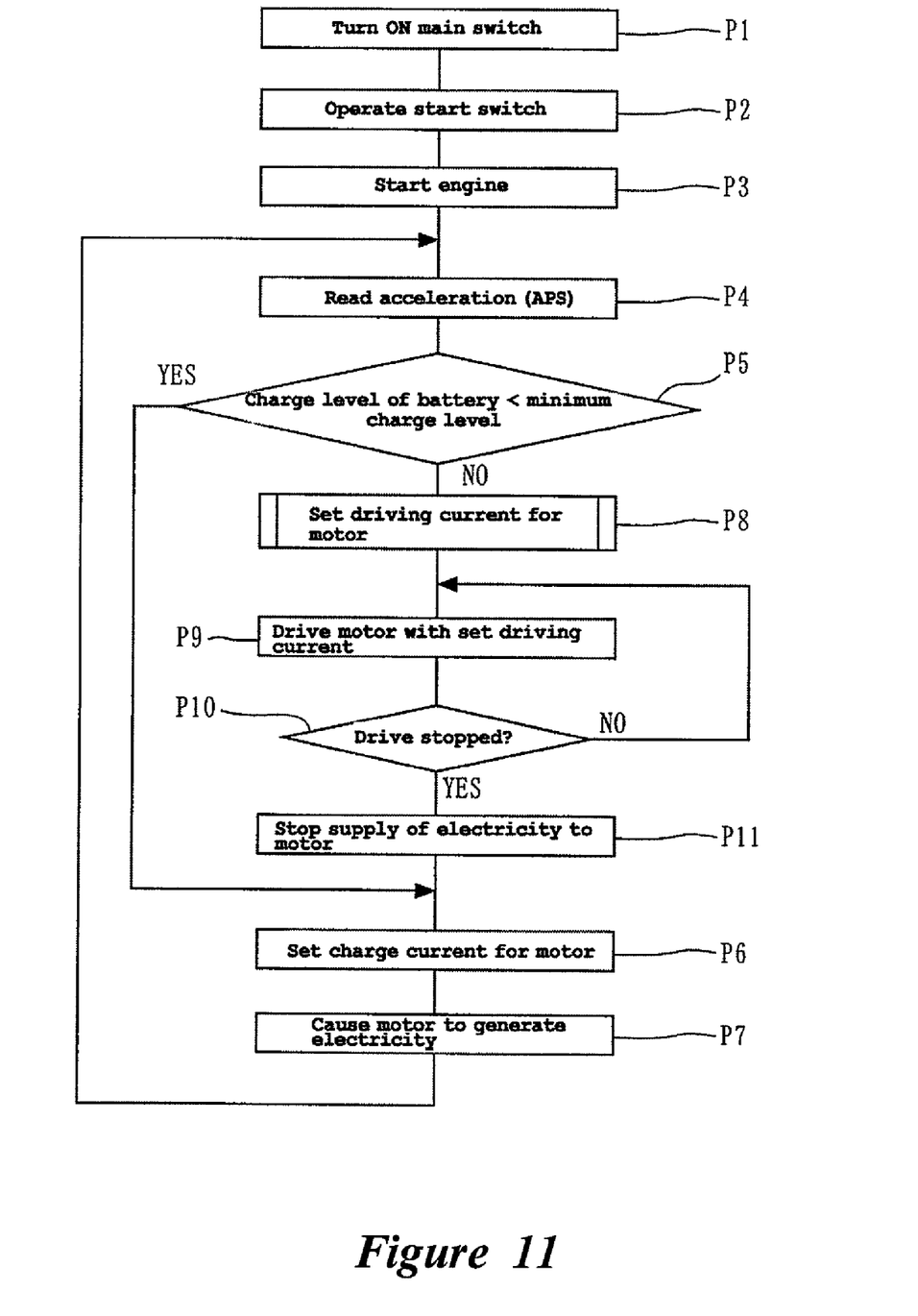
FIG. 11 is a flowchart explaining the operation of the hybrid motorcycle of FIG. 1.
Figure 12:
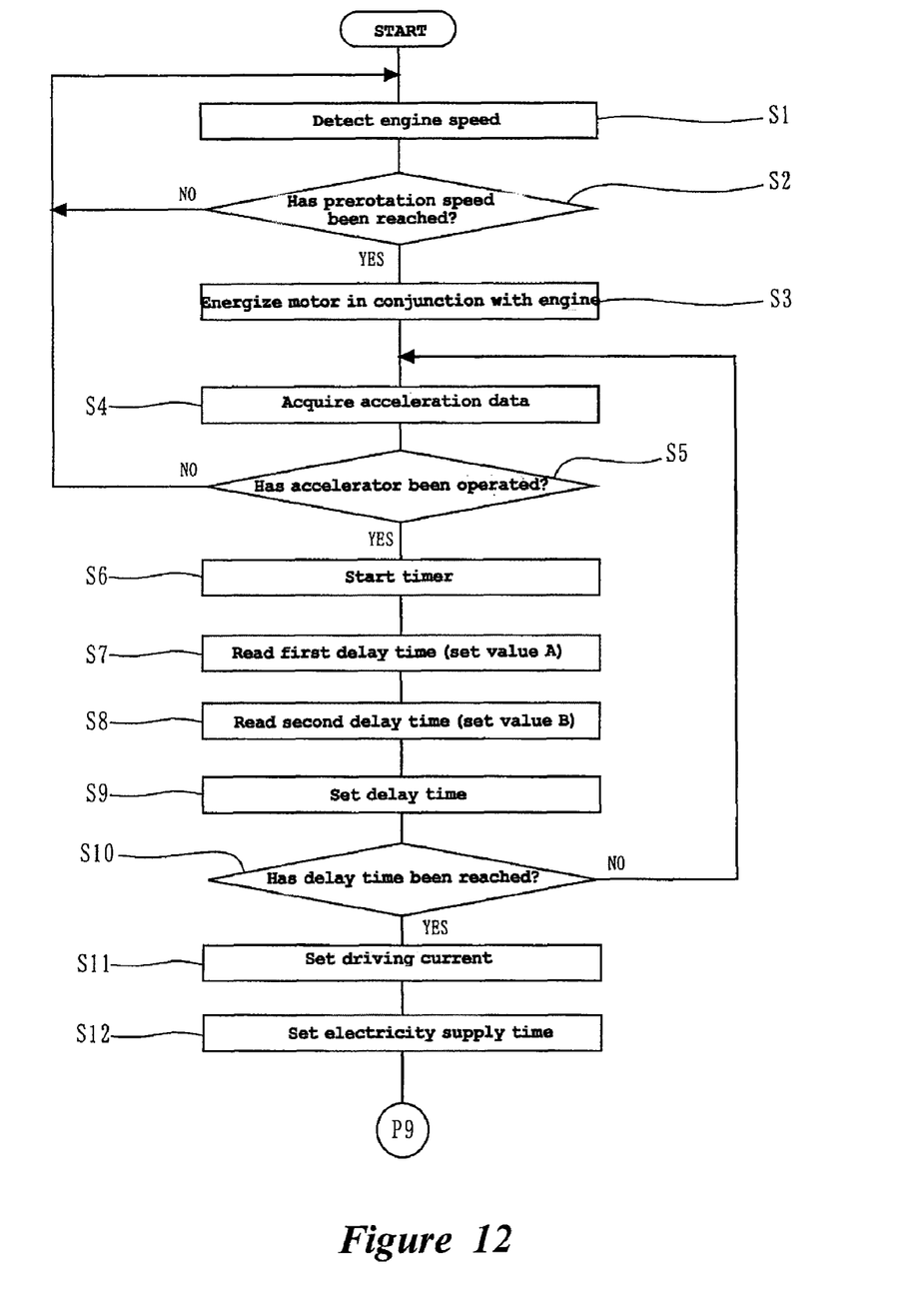
FIG. 12 is a flowchart explaining the operation of the control device after engine start such that auxiliary power can be applied by operation of the motor.

With reference now to FIGS. 11 and 12, and with additional reference to FIG. 13, operation of the motor/generator control section 62 will be described.

The engine 12 is started by turning ON the main switch 21 and then turning ON the start switch 22 in steps P1 to P3 of the flowchart shown in FIG. 11.

Figure 13:
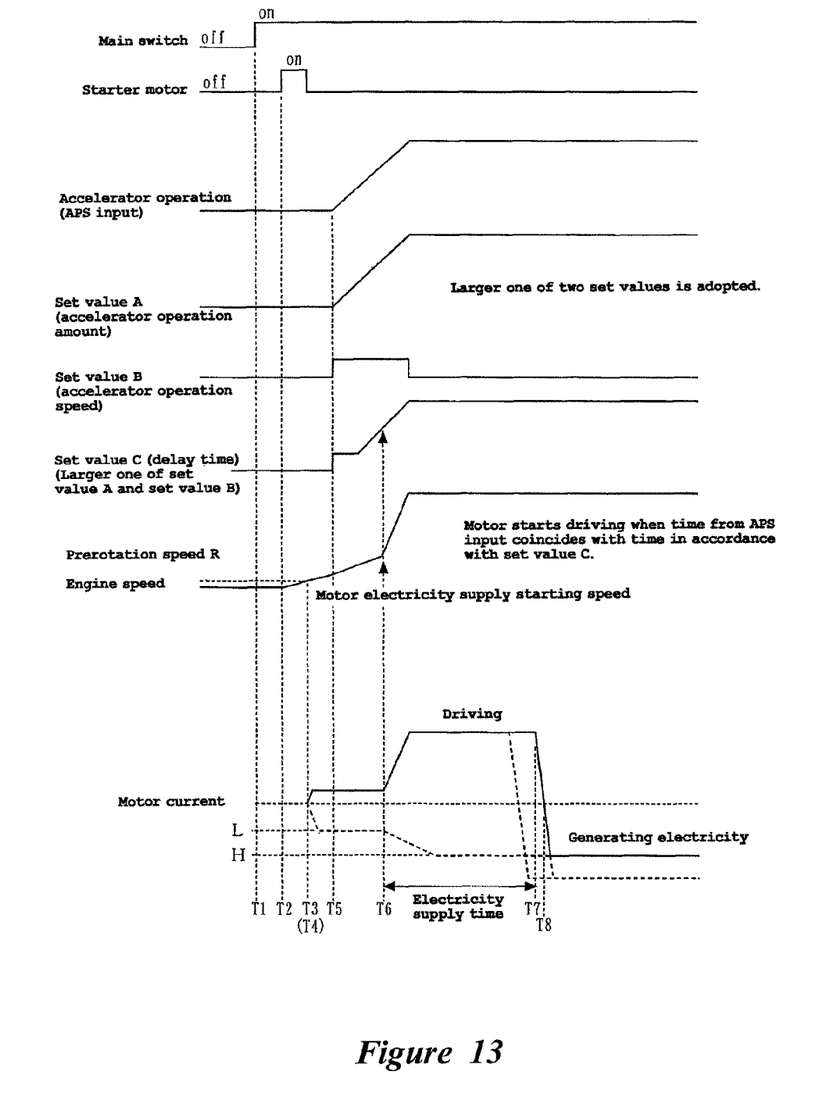
FIG. 13 is a time chart explaining the operation of the hybrid motorcycle of FIG. 1 when the accelerator is operated such that the accelerator operation amount increases generally in proportion to time from start to finish.

The timing of turning ON the main switch 21 is indicated as time T1 in FIG. 13, and the timing of turning ON the start switch 22 is indicated as time T2 in FIG. 13.

After an engine start, the acceleration data acquisition component 71 acquires acceleration data (e.g., accelerator operation amount and accelerator operation speed) in step P4, and the charge level determination component 76 determines in step P5 whether or not the charge level of the battery 23 is lower than the minimum charge amount.

If the charge level of the battery 23 is equal to the minimum charge level or lower, the precharging component 77 reads a charge current for the motor 13 from the map shown in FIG. 10 in step P6, and causes the motor 13 to function as a generator and to generate electricity so as to obtain the charge current in step P7. Then, the process returns to step P4 to repeat the above processes. The timing of when electricity generation starts in step P7 is indicated as time T3 in FIG. 13.

On the other hand, if it is determined in step P5 that the charge level of the battery 23 is higher than the minimum charge level, the process proceeds to step P8, where the driving current for the motor 13 is set. Here, the operation performed in step P8 is described with reference to the flowchart shown in FIG. 12.

First of all, the speed of the engine 12 is detected in step S1 of the flowchart shown in FIG. 12, and energization is started to rotate the motor 13 when the engine speed has reached the prerotation speed as shown in steps S2 to S3. The prerotation speed is indicated as symbol R in FIG. 13. Also, the timing at which the motor 13 rotates in conjunction with the rotation of the engine 12 is indicated as time T4 in FIG. 13.

Subsequently, acceleration data are acquired again in step S4, and it is determined in step S5 whether or not an accelerator operation has been performed. If an accelerator operation has not been performed, the process returns to step S1. If an accelerator operation has been performed, the timer 79 starts counting the time in step S6. The timing at which the accelerator operation has been performed is indicated as time T5 in FIG. 13.

Then, a set value A (e.g., the first delay time) in accordance with the accelerator operation amount at that time is read from the map shown in FIG. 5(A) in step S7 and a set value B (e.g., the second delay time) in accordance with the accelerator operation speed at that time is read from the map shown in FIG. 5(B) in step S8. Then, the larger one of the set value A and the set value B (i.e., the one that brings about a longer delay time) is set as a set value C and is used to read the final delay time from the map shown in FIG. 5(C) in step S9.

After the delay time is set in this way, it is determined in step S10 whether or not the delay time has elapsed from the moment when a first throttle operation was performed (i.e., time T5). If the delay time has not elapsed, the process returns to step S4. If the delay time has elapsed, the driving current for the motor 13 is read from the map shown in FIG. 6 in step S11, and the electricity supply time is read from the map shown in FIG. 7 in step S12. The electricity supply time becomes shorter as the charge level of the battery 23 becomes lower. When the delay time has elapsed, the timer 79 is stopped and reset.

After preparations have been made to cause the motor 13 to generate auxiliary power, the driving current is passed to the motor 13 to generate auxiliary power by the driving of the motor 13 in step P9 of the flowchart shown in FIG. 11. The timing of generating auxiliary power is indicated as time T6 in FIG. 13. At this time, the timer 79 starts counting the time.

When the delay time has elapsed from the start of the accelerator operation (T5), the automatic centrifugal clutch 16 has been engaged completely. Thus, the resultant force of the power from the engine 12 and the auxiliary power from the motor 13 is transmitted from the automatic centrifugal clutch 16 via the gear-type speed reducer 18 and the axle 17 to the rear wheel 5.

As a result, the acceleration at which this vehicle starts running is large compared to common motorcycles that run only on the power from the engine 12. Meanwhile, when the charge level of the battery 23 is lower than the minimum charge level, the electricity generation amount is increased from an electricity generation amount for idling L to an electricity generation amount for running H after the delay time has elapsed, as shown in FIG. 13.

After auxiliary power is generated by the driving of the motor 13 as discussed above, it is determined in step P10 whether or not the electricity supply time has elapsed from the start of the driving of the motor 13. If the electricity supply time has not elapsed, the process returns to step P9. If the electricity supply time has elapsed, the supply of electricity to the motor 13 is discontinued in step P11. The timing of stopping the supply of electricity is indicated as time T7 in FIG. 13.

After the supply of electricity to the motor 13 is discontinued, the motor 13 is functions as a generator and generates electricity in steps P6, P7. The timing of starting the generation of electricity is indicated as time T8 in FIG. 13. The amount of electricity generated at this time also is increased and decreased according to the charge level of the battery 23.

Aside from when the vehicle starts running as discussed above, the motor 13 is also caused to generate auxiliary power when, for example, the accelerator grip 9 is returned to an idling position while the vehicle is running and then operated to increase the running speed from a coasting state. Thus, also at this time, the automatic centrifugal clutch 16 does not slip and high acceleration performance can be achieved with the auxiliary power by the driving of the motor 13.

In the operation example shown in FIG. 13, the operation amount of the accelerator grip 9 is continuously increased from the start of the operation until the vehicle starts running. In the case where the accelerator is operated irregularly, an operation similar to the above example where only the delay time is different is used. For example, in the case where the accelerator grip 9 is once reversed slightly at the middle of the starting operation and then the starting operation is performed again, the operation as shown in FIG. 14 is performed.

Figure 14:
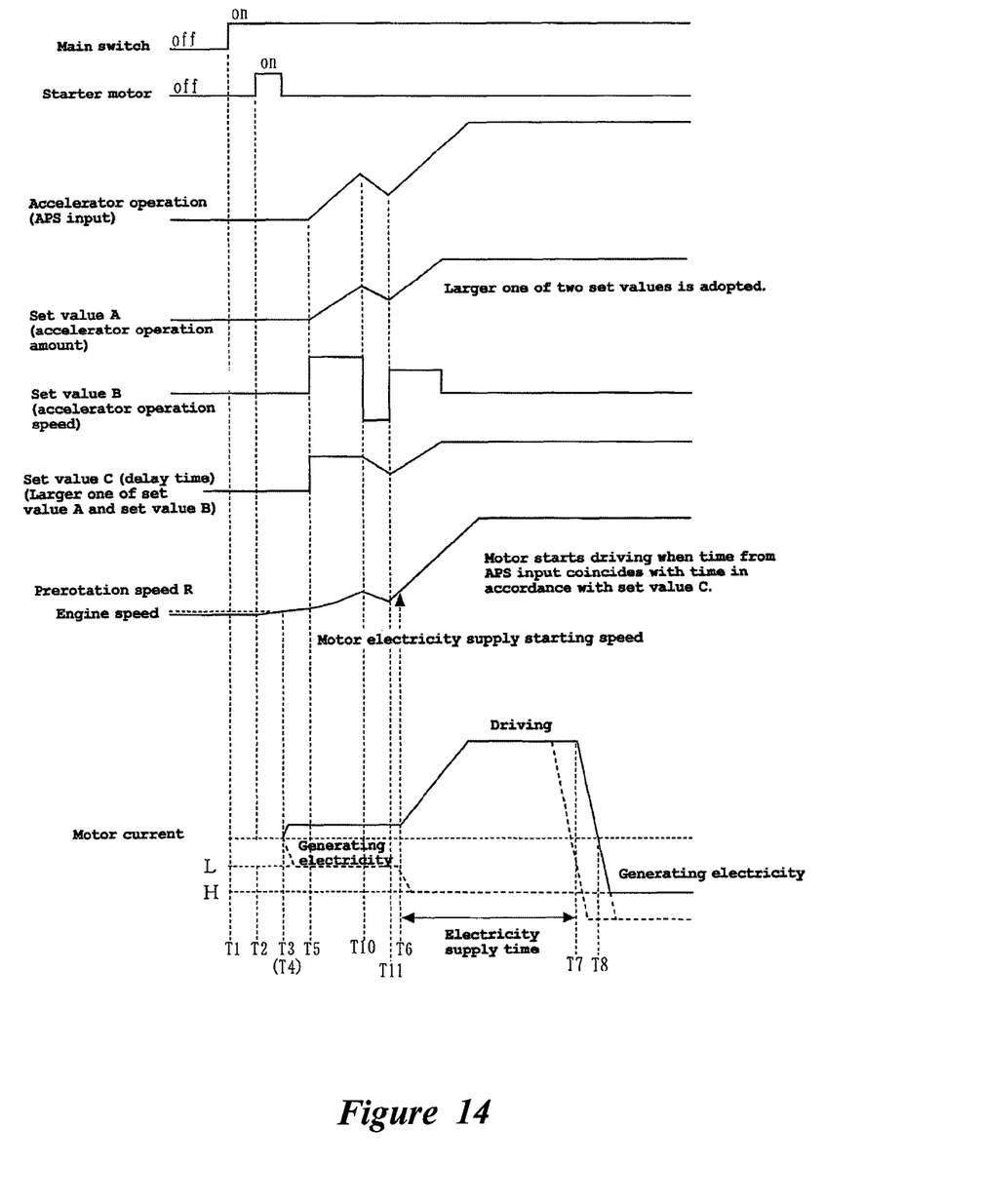
FIG. 14 is another time chart explaining the operation of the hybrid motorcycle of FIG. 1 when the accelerator is reversed slightly during its movement from start to finish such that the accelerator does not smoothly increase from start to finish.

In FIG. 14, the timing of starting the reversing operation of the accelerator grip 9 at the middle of the starting operation is indicated as time T10, and the timing at which the accelerator grip 9 is completely reversed and the starting operation is started again is indicated as time T11.

As shown in FIG. 14, the set value C, which represents the delay time, is reduced by reversing the accelerator grip 9, and increased by operating the accelerator grip 9 again. Also in this case, the motor 13 generates auxiliary power when the delay time has elapsed (T6) from the start of the accelerator operation (T5).

In the hybrid motorcycle 1 constructed as described above, the auxiliary power from the motor 13 is applied to the automatic centrifugal clutch 16 with the automatic centrifugal clutch 16 completely engaged. Thus, the resultant force of the power from the engine 12 and the auxiliary power from the motor 13 can be efficiently transmitted from the automatic centrifugal clutch 16 to the rear wheel 5 side without any loss of power in the automatic centrifugal clutch 16. Therefore, according to this embodiment, a hybrid motorcycle 1 with excellent start and acceleration performance can be manufactured.

Also, in this embodiment, an existing APS 11 that is used to control the rotation of the engine 12 is used to detect the operation amount and the operation speed of the accelerator grip 9. Thus, it is not necessary to provide a new member for detection purposes, such as sensor or switch, in order to manufacture the hybrid motorcycle 1, which contributes to cost reduction.

In the hybrid motorcycle 1 according to this embodiment, a sensor or a switch for detecting the completion of engagement of the automatic centrifugal clutch 16 is not exclusively used. Thus, according to the hybrid motorcycle 1, auxiliary power can be applied with high reliability compared to requiring a dedicated sensor or switch to detect the completion of engagement of the automatic centrifugal clutch.

In the hybrid motorcycle 1 according to this embodiment, the supply of electricity to the motor 13 is discontinued after the vehicle starts running or accelerates and when a predetermined electricity supply time has elapsed. Thus, the consumption of electricity in the battery 23 can be reduced compared to the case where the supply of electricity to the motor 13 is continued after the vehicle starts running or accelerates.

In the hybrid motorcycle 1 according to this embodiment, the electricity supply time becomes shorter as the charge level of the battery 23 becomes lower. Thus, the charge level of the battery 23 is not lowered excessively. Therefore, according to the hybrid motorcycle 1, it is possible to secure electricity for generating auxiliary power next time the auxiliary power is needed.

In the hybrid motorcycle 1 according to this embodiment, the motor 13 generates electricity after the electricity supply time has elapsed, and the battery 23 is charged with the generated electricity In this way, according to the hybrid motorcycle 1, the battery 23 can be charged after electricity in the battery 23 has been consumed. Thus, it is possible to secure sufficient electricity for supply to the motor 13 next time.

The hybrid motorcycle 1 according to this embodiment is arranged to use a longer one of the first delay time obtained based on the accelerator operation amount and the second delay time obtained based on the accelerator operation speed. Thus, the power from the motor 13 can be applied to the automatic centrifugal clutch 16 at an appropriate timing in accordance with the accelerator operation speed, even if the accelerator grip 9 is operated to fully open the throttle valve 32 in order for the vehicle to start running or in order for the vehicle to accelerate. As a result, power from the engine 12 and auxiliary power from the motor 13 can be more reliably transmitted to the rear wheel 5.

The hybrid motorcycle 1 according to this embodiment is arranged to rotate the motor 13 in conjunction with the rotation of the engine 12 after an engine start and in an operating state where the power from the motor 13 is not applied to the crankshaft 36. Thus, according to the hybrid motorcycle 1, it is possible to prevent the motor 13 from serving as a load on the engine 12 when the motor 13 is not generating auxiliary power, which stabilizes the rotation of the engine 12 in an idling state.

In the hybrid motorcycle 1 according to this embodiment, the motor 13 is rotated after the start of the engine 12 and before the speed of the engine 12 reaches an idling speed, which reduces a load on the engine 12. Thus, the engine 12 shifts to an idling state while rotating stably after an engine start, even if the motor 13 is connected to the crankshaft 36. As a result, according to the hybrid motorcycle 1, the series of operations, including starting the engine 12 and the vehicle starting and acceleration, can be performed smoothly.

In the hybrid motorcycle 1 according to this embodiment, if the charge level of the battery 23 is low, the battery 23 can be charged when auxiliary power from the motor 13 is not necessary, for example when the vehicle is at a halt. Thus, according to the hybrid motorcycle 1, the battery 23 can be prevented from being over-discharged, and it is possible to secure electricity for use to cause the motor 13 to generate auxiliary power next time.

In the above embodiment, the rotor 38 of the motor 13 is mounted on the crankshaft 36. However, the motor 13 may be formed separately from the engine 12. In such a case, the rotary shaft of the motor 13 and the crankshaft 36 may be connected directly or via a transmission means that can maintain the ratio between the speeds of both the shafts to a constant value.

In the above embodiment, both the accelerator operation amount and the accelerator operation speed are used to set the delay time. However, only the accelerator operation amount may be used to set the delay time. Also, in the above embodiment, the driving current supplied to the motor 13 in order to cause the motor 13 to generate auxiliary power is increased and decreased in proportion to the accelerator operation amount. However, the driving current may be increased and decreased in consideration of the accelerator operation speed as well.

In the above embodiment, the present invention is applied to a scooter. However, the present invention is not limited thereto, and may be applied to other types of vehicles, including motorcycles.

Although the present invention has been described in terms of certain embodiments, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A hybrid motorcycle comprising:
   at least one wheel;
   a power transmission system connected to the at least one wheel;
   a power unit including an engine and a motor connected to a crankshaft of the engine, the motor being configured to apply auxiliary power to the crankshaft and to generate electricity when driven by the crankshaft;
   an accelerator operating element connected to the power unit;
   an automatic centrifugal clutch interposed in the power transmission system between the power unit and the at least one wheel;
   an acceleration data acquisition component arranged to acquire as acceleration data at least an accelerator operation amount of the accelerator operating element and an accelerator operation speed of the accelerator operating element;
a delay time setting component arranged to set a delay time by which start of operation of the motor is delayed based upon the accelerator operation amount of the accelerator operating element and the accelerator operation speed of the accelerator operating element; and
a motor controller arranged to supply the motor with a magnitude of electricity in accordance with the acceleration data after the delay time has elapsed from a moment when the accelerator operating element was moved from an idling position.

2. The hybrid motorcycle of claim 1, wherein the delay time setting component uses a longer one of a first delay time and a second delay time, the first delay time being based on the accelerator operation amount and the second delay time being based on the accelerator operation speed.

3. The hybrid motorcycle of claim 2, wherein the motor controller includes a prerotation component that is arranged to rotate the motor in conjunction with rotation of the engine after an engine start and in an operating state in which power from the motor is not applied to the crankshaft.

4. The hybrid motorcycle of claim 1, wherein the motor controller includes a prerotation component that is arranged to rotate the motor in conjunction with rotation of the engine after an engine start and in an operating state in which power from the motor is not applied to the crankshaft.

5. The hybrid motorcycle of claim 1, further comprising an electricity supply restriction component that continues the supply of electricity to the motor for a predetermined electricity supply time and that discontinues the supply of electricity to the motor after the electricity supply time has elapsed.

6. The hybrid motorcycle of claim 5, wherein the motor controller includes a prerotation component that is arranged to rotate the motor in conjunction with rotation of the engine after an engine start and in an operating state in which power from the motor is not applied to the crankshaft.

7. The hybrid motorcycle of claim 5, wherein the delay time setting component uses a longer one of a first delay time and a second delay time, the first delay time being based on the accelerator operation amount and the second delay time being based on the accelerator operation speed.

8. The hybrid motorcycle of claim 7, wherein the motor controller includes a prerotation component that is arranged to rotate the motor in conjunction with rotation of the engine after an engine start and in an operating state in which power from the motor is not applied to the crankshaft.

9. The hybrid motorcycle of claim 5, further comprising a charging component that is arranged to cause the motor to generate electricity after the electricity supply time has elapsed such that a battery can be charged with the generated electricity.

10. The hybrid motorcycle of claim 9, wherein the motor controller includes a prerotation component that is arranged to rotate the motor in conjunction with rotation of the engine after an engine start and in an operating state in which power from the motor is not applied to the crankshaft.

11. The hybrid motorcycle of claim 9, wherein the delay time setting component uses a longer one of a first delay time and a second delay time, the first delay time being based on the accelerator operation amount and the second delay time being based on the accelerator operation speed.

12. The hybrid motorcycle of claim 11, wherein the motor controller includes a prerotation component that is arranged to rotate the motor in conjunction with rotation of the engine after an engine start and in an operating state in which power from the motor is not applied to the crankshaft.

13. The hybrid motorcycle of claim 5, further comprising a charge level detection component that is arranged to detect a charge level of the battery such that the electricity supply restriction component can shorten the electricity supply time as the charge level detected by the charge level detection component decreases.

14. The hybrid motorcycle of claim 13, wherein the motor controller includes a prerotation component that is arranged to rotate the motor in conjunction with rotation of the engine after an engine start and in an operating state in which power from the motor is not applied to the crankshaft.

15. The hybrid motorcycle of claim 13, wherein the delay time setting component uses a longer one of a first delay time and a second delay time, the first delay time being based on the accelerator operation amount and the second delay time being based on the accelerator operation speed.

16. The hybrid motorcycle of claim 15, wherein the motor controller includes a prerotation component that is arranged to rotate the motor in conjunction with rotation of the engine after an engine start and in an operating state in which power from the motor is not applied to the crankshaft.

17. The hybrid motorcycle of claim 13, further comprising a charging component that is arranged to cause the motor to generate electricity after the electricity supply time has elapsed such that the battery can be charged with the generated electricity.

18. The hybrid motorcycle of claim 17, wherein the motor controller includes a prerotation component that is arranged to rotate the motor in conjunction with rotation of the engine after an engine start and in an operating state in which power from the motor is not applied to the crankshaft.

19. The hybrid motorcycle of claim 17, wherein the delay time setting component uses a longer one of a first delay time and a second delay time, the first delay time being based on the accelerator operation amount and the second delay time being based on the accelerator operation speed.

20. The hybrid motorcycle of claim 19, wherein the motor controller includes a prerotation component that is arranged to rotate the motor in conjunction with rotation of the engine after an engine start and in an operating state in which power from the motor is not applied to the crankshaft.

21. The hybrid motorcycle of claim 20, wherein a rotation start timing at which the prerotation component rotates the motor in conjunction with rotation of the engine is set to a time after an engine start and when an engine speed is lower than an idling speed.

22. The hybrid motorcycle of claim 20, further comprising:
a charge level determination component that is arranged to determine whether or not the charge level of the battery is lower than a predetermined minimum charge level; and
a precharging component that is arranged to cause the motor to generate electricity and charge the battery with the generated electricity after an engine start and in an operating state in which power from the motor is not applied to the crankshaft if the charge level determination component determines that the charge level of the battery is lower than the predetermined minimum charge level.

* * * * *